US012658160B2

(12) United States Patent
Ban et al.

(10) Patent No.: US 12,658,160 B2
(45) Date of Patent: Jun. 16, 2026

(54) DISPLAY APPARATUS FOR AUTOMATICALLY CHANGING SCREEN SETTING AND CONTROL METHOD THEREOF

(71) Applicant: SAMSUNG ELECTRONICS CO., LTD., Suwon-si (KR)

(72) Inventors: Seokho Ban, Suwon-si (KR); Dongho Lee, Suwon-si (KR); Sunyoung Kim, Suwon-si (KR); Youngwook Kim, Suwon-si (KR); Sooyeoun Yoon, Suwon-si (KR); Yongjoo Lee, Suwon-si (KR); Bumho Chun, Suwon-si (KR); Jaewon Jung, Suwon-si (KR); Nakwon Choi, Suwon-si (KR); Suan Choi, Suwon-si (KR); Saerom Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/785,802

(22) Filed: Jul. 26, 2024

(65) Prior Publication Data

US 2025/0069566 A1 Feb. 27, 2025

Related U.S. Application Data

(63) Continuation of application No. PCT/KR2024/008439, filed on Jun. 19, 2024.

(30) Foreign Application Priority Data

Aug. 22, 2023 (KR) ........................ 10-2023-0110059

(51) Int. Cl.
*G06F 3/038* (2013.01)
*G09G 5/00* (2006.01)

(52) U.S. Cl.
CPC ....... *G09G 5/006* (2013.01); *G09G 2370/042* (2013.01)

(58) Field of Classification Search
CPC ......................... G09G 5/006; G09G 2370/042
(Continued)

(56) References Cited

U.S. PATENT DOCUMENTS

| | | | |
|---|---|---|---|
| 9,799,251 | B2 | 10/2017 | Cho et al. |
| 10,416,950 | B2 | 9/2019 | Kim et al. |

(Continued)

FOREIGN PATENT DOCUMENTS

| | | | |
|---|---|---|---|
| JP | 2011-257540 | A | 12/2011 |
| JP | 5089441 | B2 | 12/2012 |

(Continued)

OTHER PUBLICATIONS

International Search Report and Written Opinion (PCT/ISA/210 and PCT/ISA/237) dated Sep. 30, 2024, issued by International Searching Authority for International Application No. PCT/KR2024/008439.

*Primary Examiner* — Jonathan M Blancha
(74) *Attorney, Agent, or Firm* — Sughrue Mion, PLLC

(57) ABSTRACT

A display apparatus may include: at least one processor configured to execute instructions to: based on identifying that the display apparatus is connected with a second display apparatus, identify a past connection history with the second display apparatus and first screen setting information corresponding to the past connection history, stored in the at least one memory; based on receiving second screen setting information of a second display in the second display apparatus through the communication interface, compare the first screen setting information and the second screen setting information; based on identifying that the first screen setting information and the second screen setting information are (Continued)

different as a result of the comparing, control the first display to display a message requesting to select one of the first screen setting information or the second screen setting information; and change a screen setting of the display based on a selected screen setting information.

20 Claims, 11 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 10,416,951 | B2 | 9/2019 | Park | |
| 10,649,412 | B2 | 5/2020 | Nixon et al. | |
| 2006/0150108 | A1* | 7/2006 | Adachi | G09G 5/14 715/750 |
| 2006/0284861 | A1 | 12/2006 | Choi | |
| 2013/0169604 | A1* | 7/2013 | Cho | H04N 21/4854 345/204 |
| 2016/0155410 | A1 | 6/2016 | Nam | |
| 2017/0139664 | A1 | 5/2017 | Park | |
| 2022/0304090 | A1* | 9/2022 | Asafuji | H04W 76/15 |
| 2023/0410717 | A1 | 12/2023 | Kim et al. | |

FOREIGN PATENT DOCUMENTS

| | | | |
|---|---|---|---|
| KR | 10-0617664 | B1 | 8/2006 |
| KR | 10-2006-0133236 | A | 12/2006 |
| KR | 10-2015-0100123 | A | 9/2015 |
| KR | 10-2017-0055636 | A | 5/2017 |
| KR | 10-2018-0136174 | A | 12/2018 |
| KR | 10-2022-0151827 | A | 11/2022 |
| WO | 2016/047855 | A1 | 3/2016 |

* cited by examiner

DISPLAY APPARATUS FOR AUTOMATICALLY CHANGING SCREEN SETTING AND CONTROL METHOD THEREOF

CROSS-REFERENCE TO RELATED APPLICATIONS

This application is a continuation of PCT/KR2024/008439, filed on Jun. 19, 2024, at the Korean Intellectual Property Receiving Office and claims priority under 35 U.S.C. § 119 to Korean Patent Application No. 10-2023-0110059, filed on Aug. 22, 2023, in the Korean Intellectual Property Office, the disclosure of which is incorporated by reference herein in its entirety.

BACKGROUND

1. Field

The disclosure relates to a display apparatus and a control method thereof, and more particularly, to a display apparatus that automatically changes a screen setting, and a control method thereof.

2. Description of Related Art

Various types of display apparatuses are being developed and improving users' convenience.

For example, a modular display can be used by a user by connecting the modular display to various display apparatuses. For example, a user can use a modular display by connecting it to a laptop personal computer (PC) or a desktop PC.

However, there is inconvenience that the screen setting of a modular display needs to be changed whenever the space in which the modular display is used is changed, or a display apparatus connected with the modular display is changed.

SUMMARY

According to an aspect of the disclosure, a display apparatus may include: at least one memory storing instructions; a first display; a communication interface; and at least one processor operatively connected with the at least one memory and the first display and configured to control the display apparatus, wherein the at least one processor is configured to execute the instructions to: based on identifying that the display apparatus is connected with a second display apparatus, identify a past connection history with the second display apparatus and first screen setting information corresponding to the past connection history, stored in the at least one memory; based on receiving second screen setting information of a second display in the second display apparatus through the communication interface, compare the first screen setting information and the second screen setting information; based on identifying that the first screen setting information and the second screen setting information are different as a result of the comparing, control the first display to display a message requesting to select one of the first screen setting information or the second screen setting information; and change a screen setting of the display based on a selected screen setting information.

The communication interface may be wireless. The display apparatus further may include a user interface. The at least one processor may be further configured to execute the instructions to: based on receiving a user instruction selecting one of the first screen setting information or the second screen setting information through the user interface, change the screen setting of the display apparatus based on the selected screen setting information corresponding to the user instruction.

The at least one processor may be further configured to execute the instructions to: based on receiving the user instruction, change the screen setting of the display apparatus based on the selected screen setting information, and control the communication interface to transmit the selected screen setting information to the second display apparatus.

The at least one processor may be further configured to execute the instructions to: control the communication interface to transmit the first screen setting information to the second display apparatus; and based on receiving the second screen setting information from the second display apparatus through the communication interface, change the screen setting of the display apparatus based on the second screen setting information.

The display apparatus further may include: a power interface. The at least one processor may be further configured to execute the instructions to: based on being connected with the second display apparatus, receive power from the second display apparatus through the power interface, and receive a content from the second display apparatus through the communication interface.

The at least one processor may be further configured to execute the instructions to: based on a connection with the second display apparatus being ended, map identification information of the second display apparatus and screen setting information on a time point when the connection with the second display apparatus is ended; and store the identification information in the at least one memory.

The at least one memory may be configured to: store a plurality of identification information of a plurality of electronic apparatuses and a plurality of screen setting information corresponding to each of the plurality of identification information as the past connection history. The at least one processor may be further configured to execute the instructions to: based on identifying that the display apparatus is connected with the second display apparatus, identify the second screen setting information corresponding to the second display apparatus among the plurality of screen setting information stored in the at least one memory.

The display apparatus further may include a sensor. The at least one processor may be configured to execute the instructions to: identify that the display apparatus is connected with the second display apparatus through the sensor.

The display apparatus may be a modular display.

According to aspect of the disclosure, a control method of a display apparatus may include: based on identifying that the display apparatus is connected with a second display apparatus, identifying a past connection history with the second display apparatus and first screen setting information corresponding to the past connection history, stored in the display apparatus; based on receiving second screen setting information of a second display in the second display apparatus from the second display apparatus through a communication interface, comparing the first screen setting information and the second screen setting information; based on identifying that the first screen setting information and the second screen setting information are different as a result of the comparing, displaying a message requesting to select one of the first screen setting information or the second screen setting information; and changing a screen setting of the display apparatus based on a selected screen setting information.

The communication interface may be wireless.

The changing the screen setting may include: based on receiving a user instruction selecting one of the first screen setting information or the second screen setting information, changing the screen setting of the display apparatus based on the selected screen setting information corresponding to the user instruction.

The changing the screen setting may further include transmitting the selected screen setting information to the second display apparatus.

The control method further may include: transmitting the first screen setting information to the second display apparatus. The changing may include: based on receiving second screen setting information of a second display in the second display apparatus from the second display apparatus, changing the screen setting of the display apparatus based on the second screen setting information.

The control method further may include: based on being connected with the second display apparatus, receiving power from the second display apparatus through a power interface, and receiving a content from the second display apparatus through the communication interface.

The control method further may include: based on a connection with the second display apparatus being ended, mapping identification information of the second display apparatus and screen setting information on a time point when the connection with the second display apparatus is ended; and store the identification information in at least one memory.

The control method further may include: storing, on at least one memory, a plurality of identification information of a plurality of electronic apparatuses and a plurality of screen setting information corresponding to each of the plurality of identification information as the past connection history; and based on identifying that the display apparatus is connected with the second display apparatus, identifying the second screen setting information corresponding to the second display apparatus among the plurality of screen setting information stored in the at least one memory.

The control method further may include: identifying that the display apparatus is connected with the second display apparatus through a sensor.

The display apparatus may be a modular display.

BRIEF DESCRIPTION OF THE DRAWINGS

The above and other aspects, features, and advantages of the disclosure will be more clearly understood from the following detailed description, taken in conjunction with the accompanying drawings, in which.

DETAILED DESCRIPTION

Figure 1:
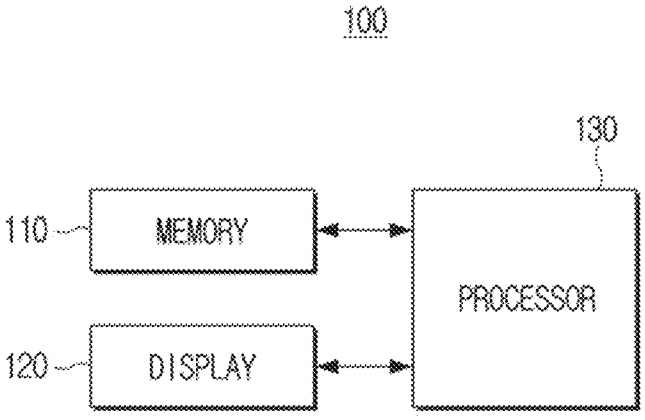
FIG. 1 is a block diagram illustrating a configuration of a display apparatus according to one or more embodiments of the disclosure.

The embodiments of the present disclosure may be diversely modified. Accordingly, specific embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions are not described in detail since they would obscure the disclosure with unnecessary detail.

The purpose of the disclosure is in providing a display apparatus for automatically changing a screen setting of a modular display, and a control method thereof.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. In addition, such expressions are used only to distinguish one element from another element, and are not intended to limit the elements.

Also, singular expressions include plural expressions, as long as they do not obviously mean differently in the context. Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in this specification, the term "user" may refer to a person who uses an electronic apparatus or an apparatus using an electronic apparatus (e.g., an artificial intelligence electronic apparatus).

Hereinafter, various embodiments of the disclosure will be described in more detail with reference to the accompanying drawings.

FIG. 1 is a block diagram illustrating a configuration of a display apparatus 100 according to one or more embodiments of the disclosure.

The display apparatus 100 may automatically change a screen setting. For example, the display apparatus 100 may be implemented as a modular display, and change the screen setting based on another display apparatus connected with the display apparatus 100. However, the disclosure is not limited thereto, and the display apparatus 100 can be any apparatus that includes a display, and can be connected with another display apparatus, and can change the screen setting. For example, the display apparatus 100 may be an apparatus that includes a display, and is connected with another display apparatus, and changes the screen setting based on the another display apparatus such as a TV, a desktop PC, a laptop, a smartphone, a tablet PC, etc.

According to FIG. 1, the display apparatus 100 includes a memory 110, a display 120, and a processor 130.

The memory 110 may refer to hardware that stores information such as data, etc. in an electric or a magnetic form so that the processor 130, etc. can access the information. For this, the memory 110 may be implemented as at least one hardware among a non-volatile memory, a volatile memory, a flash memory, a hard disk drive (HDD) or a solid state drive (SSD), a RAM, a ROM, etc.

In the memory 110, at least one instruction necessary for the operations of the display apparatus 100 or the processor 130 may be stored. Here, the instruction is a code unit instructing the operation of the display apparatus 100 or the processor 130, and it may have been drafted in a machine language which is a language that can be understood by a computer. Alternatively, in the memory 110, a plurality of instructions that perform specific tasks of the display apparatus 100 or the processor 130 may be stored as an instruction set.

Also, in the memory 110, data which is information in bit or byte units that can indicate characters, numbers, images, etc. may be stored. For example, in the memory 110, a screen setting module, etc. may be stored.

The memory 110 may be accessed by the processor 130, and reading/recording/correction/deletion/update, etc. for an instruction, an instruction set, or data may be performed by the processor 130.

The display 120 is a component that displays images, and may be implemented as displays in various forms such as a liquid crystal display (LCD), an organic light emitting diodes (OLED) display, a plasma display panel (PDP), etc. Inside the display 120, a driving circuit that may be implemented in forms such as an a-si TFT, a low temperature poly silicon (LTPS) TFT, an organic TFT (OTFT), etc., and a backlight unit, etc. may also be included together. The display 120 may be implemented as a touch screen combined with a touch sensor, a flexible display, a 3D display, etc.

The processor controls the overall operations of the display apparatus 100. Specifically, the processor 130 may be connected with each component of the display apparatus 100 and control the overall operations of the display apparatus 100. For example, the processor 130 may be connected with components such as the memory 110, the display 120, a communication interface, etc., and control the operations of the display apparatus 100.

The at least one processor 130 may include one or more of a central processing unit (CPU), a graphics processing unit (GPU), an accelerated processing unit (APU), a many integrated core (MIC), a neural processing unit (NPU), a hardware accelerator, or a machine learning accelerator. The at least one processor 130 may control one or a random combination of other components of the display apparatus 100, and perform operations regarding communication or data processing. The at least one processor 130 may execute one or more programs or instructions stored in the memory 110. For example, the at least one processor 130 may perform the method according to one or more embodiments of the disclosure by executing the one or more instructions stored in the memory 110.

In case the method according to one or more embodiments of the disclosure includes a plurality of operations, the plurality of operations may be performed by one processor, or performed by a plurality of processors. For example, when a first operation, a second operation, and a third operation are performed by the method according to one or more embodiments, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The at least one processor 130 may be implemented as a single core processor including one core, or it may be implemented as one or more multicore processors including a plurality of cores (e.g., multicores of the same kind or multicores of different kinds). In case the at least one processor 130 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method according to one or more embodiments of the disclosure and perform the instruction, or the plurality of entire cores (or some of the cores) may be linked with one another, and read a program instruction for implementing the method according to one or more embodiments of the disclosure and perform the instruction.

In case the method according to one or more embodiments of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to one or more embodiments, all of the first operation, the second operation, and the third operation may be performed by a first core included in the multicore processors, or the first operation and the second operation may be performed by the first core included in the multicore processors, and the third operation may be performed by a second core included in the multicore processors.

In the embodiments of the disclosure, the at least one processor 130 may mean a system on chip (SoC) wherein at least one processor and other electronic components are integrated, a single core processor, a multicore processor, or a core included in the single core processor or the multicore processor. Also, here, the core may be implemented as a CPU, a GPU, an APU, a MIC, an NPU, a hardware accelerator, or a machine learning accelerator, etc., but the embodiments of the disclosure are not limited thereto. However, from below, the operations of the display apparatus 100 will be explained with the expression 'the processor 130,' for the convenience of explanation.

If it is identified that the display apparatus 100 is connected with another display apparatus, the processor 130 may identify a past connection history with the another display apparatus stored in the memory 110, and change the screen setting of the display 120 based on screen setting information corresponding to the past connection history.

For example, the memory 110 may store a plurality of identification information of a plurality of electronic apparatuses and a plurality of screen setting information corresponding to each of the plurality of identification information as the past connection history. For example, in case the display apparatus 100 is connected to a first electronic apparatus, the processor 130 may map first identification information of the first electronic apparatus and first screen setting information of the display 120, and store the information in the memory 110. Also, in case the display apparatus 100 is connected to a second electronic apparatus after the connection with the first electronic apparatus was released, the processor 130 may map second identification information of the second electronic apparatus and second screen setting information of the display 120, and store the information in the memory 110.

If it is identified that the display apparatus 100 is connected with another display apparatus, the processor 130 may identify screen setting information corresponding to the another display apparatus among the plurality of screen setting information stored in the memory 110, and change the screen setting of the display 120 based on the identified screen setting information.

In the aforementioned embodiment, in case the display apparatus 100 is connected to the first electronic apparatus again after the connection with the second electronic apparatus was released, the processor 130 may identify the first electronic apparatus, and change the screen setting of the display 120 based on the first screen setting information mapped to the identification information of the first electronic apparatus. That is, the processor 130 may automatically change the screen setting of the display 120, and the user may use the display apparatus 100 with the previous screen setting without having to change the screen setting separately.

After the display apparatus 100 is connected with the first electronic apparatus, the processor 130 may change the screen setting of the display 120, and if the screen setting of the display 120 is re-changed according to the user's manipulation, the processor 130 may map the first identification information of the first electronic apparatus and the re-changed screen setting information of the display 120, and store the information in the memory 110. Here, the processor 130 may delete the past screen setting information that was mapped to the first identification information of the first electronic apparatus. Alternatively, if the screen setting of the display 120 is re-changed, the processor 130 may update the past screen setting information that was mapped to the first identification information to the current screen setting information.

The display apparatus 100 may further include a communication interface, and if another screen setting information of another display included in another display apparatus is received from the another display apparatus through the communication interface, the processor 130 may compare the screen setting information and the another screen setting information, and if it is identified that the screen setting information and the another screen setting information are different as a result of the comparison, the processor 130 may control the display 120 to display a message inducing to select one of the screen setting information or the another screen setting information.

For example, in case the display apparatus 100 was connected to another display apparatus in the past, the screen of the display 120 of the display apparatus 100 and the screen of another display of the another display apparatus may be in a state of having been set based on the screen setting information. Afterwards, when the connection of the display apparatus 100 with the another display apparatus is released, and the screen setting of the another display apparatus is changed, even if the display apparatus 100 is re-connected to the another display apparatus, the screen settings of the two apparatuses may be different. In this case, the processor 130 may control the display 120 to display a message inducing to select one of the two kinds of screen setting information.

The display apparatus 100 may further include a user interface, and if a user instruction selecting one of screen setting information or another screen setting information is received through the user interface, the processor 130 may change the screen setting of the display 120 based on the screen setting information corresponding to the user instruction.

If a user instruction selecting screen setting information is received through the user interface, the processor 130 may change the screen setting of the display 120 based on the screen setting information, and control the communication interface to transmit the screen setting information to another display apparatus. Alternatively, if a user instruction selecting another screen setting information is received through the user interface, the processor 130 may change the screen setting of the display 120 based on the another screen setting information, and map the identification information of the another display apparatus and the another screen setting information, and store the memory in the memory 110.

In the above, one or more embodiments wherein the display apparatus 100 performs an operation of synchronizing the screen setting with another display apparatus was explained. However, the disclosure is not limited thereto, and another display apparatus which is not the display apparatus 100 may perform an operation of synchronizing the screen setting.

For example the display apparatus 100 may further include a communication interface, and the processor 130 may control the communication interface to transmit screen setting information to another display apparatus. In this case, the another display apparatus may compare the screen setting information received from the display apparatus 100 and the another screen setting information of the another display apparatus, and if it is identified that the screen setting information and the another screen setting information are different as a result of the comparison, control the another display to display a message inducing to select one of the screen setting information or the another screen setting information.

If a user instruction selecting the screen setting information is received, the another display apparatus may change the screen setting of the another display based on the screen setting information. In this case, the another display apparatus does not provide information related to the screen setting to the display apparatus 100, and thus the display apparatus 100 may not perform any additional operation. Alternatively, if a user instruction selecting the another screen setting information is received, the another display apparatus may transmit the another screen setting information to the display apparatus 100. In this case, the processor 130 may change the screen setting of the display 120 based on the another screen setting information, and map the identification information of the another display apparatus and the another screen setting information, and store the information in the memory 110.

In the above, it was explained that the processor 130 changes the screen of the display 120 based on a past connection history with another display apparatus, but the disclosure is not limited thereto. For example, the processor 130 may change the screen of the display 120 by further considering a communication standard with another display apparatus as well as the another display apparatus. For example, in case the display apparatus 100 is connected with another display apparatus in an HDMI standard, the processor 130 may change the screen setting of the display 120 based on the first screen setting information, and in case the display apparatus 100 is connected with another display apparatus in a Bluetooth standard, the processor 130 may change the screen setting of the display 120 based on the second screen setting information.

The display apparatus 100 may further include a power interface and a communication interface, and if the display apparatus 100 is connected with another display apparatus, the processor 130 may receive power from the another display apparatus through the power interface, and receive a content from the another display apparatus through the communication interface.

The processor 130 may change the screen of the display 120 by further considering the type of a content as well as another display apparatus. For example, if a content is received from another display apparatus, the processor 130 may identify the type of the content, and if the type of the content is a first type, the processor 130 may change the screen setting of the display 120 based on the first screen setting information, and if the type of the content is a second type, the processor 130 may change the screen setting of the display 120 based on the second screen setting information.

If connection with another display apparatus is released, the processor 130 may map the identification information of the another display apparatus and the screen setting information of the display 120 on a time point when the connection with the another display apparatus is released, and store the information in the memory 110.

The display apparatus 100 may further include a sensor, and the processor 130 may identify that the display apparatus 100 is connected with another display apparatus through the sensor. For example, the processor 130 may identify another display apparatus through a near field communication (NFC) function. However, the disclosure is not limited thereto, and any method that can identify another display apparatus can be used. For example, the display apparatus 100 may be connected with another display apparatus 200 through a pogo-pin connector or a USB-C type connector, and the processor 130 may identify whether the display apparatus 100 is connected with another display apparatus, identification information, etc. based on data received through the pogo-pin connector or the USB-C type connector.

Figure 2:
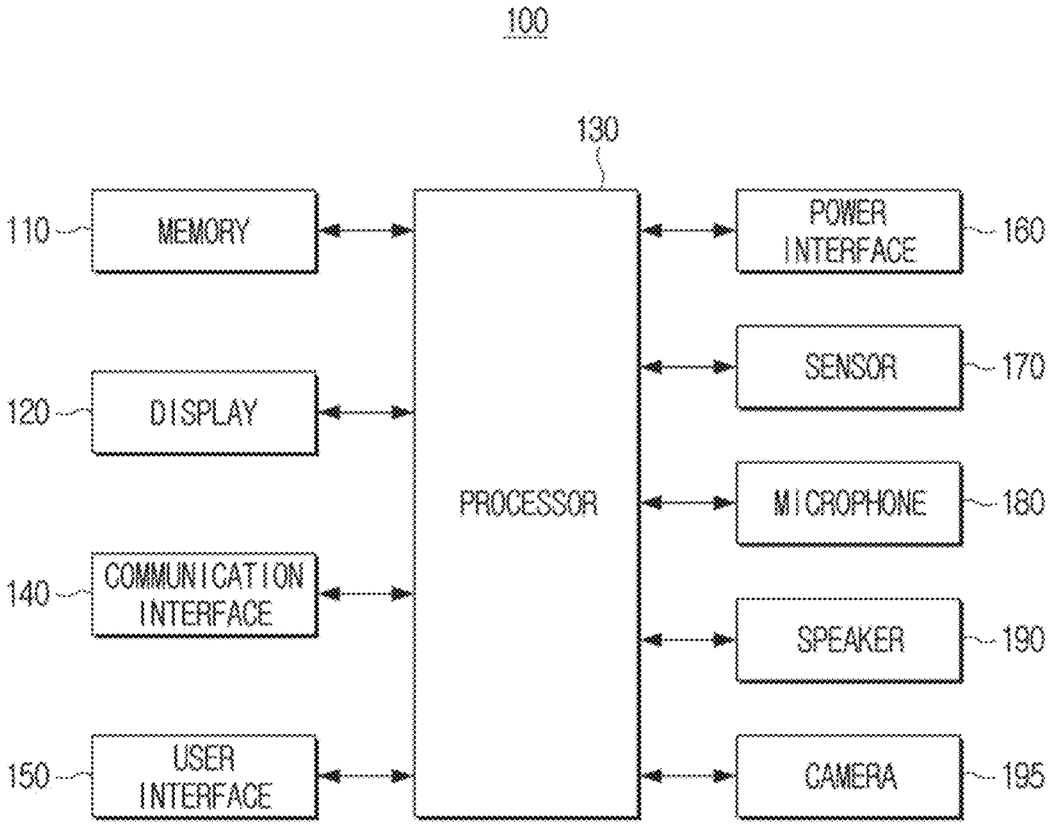
FIG. 2 is a block diagram illustrating a detailed configuration of a display apparatus according to one or more embodiments of the disclosure.

FIG. 2 is a block diagram illustrating a detailed configuration of the display apparatus 100 according to one or more embodiments of the disclosure. The display apparatus 100 may include a memory 110, a display 120, and a processor 130. Also, according to FIG. 2, the display apparatus 100 may further include a communication interface 140, a user interface 150, a power interface 160, a sensor 170, a microphone 180, a speaker 190, and a camera 195. Among the components illustrated in FIG. 2, regarding parts overlapping with the components illustrated in FIG. 1, detailed explanation will be omitted.

The communication interface 140 is a component that performs communication with various types of external apparatuses according to various types of communication methods. For example, the display apparatus 100 may perform communication with another display apparatus through the communication interface 140.

The communication interface 140 may include a Wi-Fi module, a Bluetooth module, an infrared communication module, and a wireless communication module, etc. Here, each communication module may be implemented in a form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Alternatively, the communication interface 140 may include a wired communication interface such as an HDMI, a DP, a Thunderbolt, a USB, an RGB, a D-SUB, a DVI, etc.

Other than the above, the communication interface 140 may include at least one of a local area network (LAN) module, an Ethernet module, or a wired communication module that performs communication by using a pair cable, a coaxial cable, or an optical fiber cable, etc.

The user interface 150 may be implemented as a button, a touch pad, a mouse, and a keyboard, etc., or implemented as a touch screen that can perform both of a display function and a manipulation input function. Here, a button may be various types of buttons such as a mechanical button, a touch pad, a wheel, etc. formed in any areas such as the front surface part, the side surface part, the rear surface part, etc. of the exterior of the main body of the display apparatus 100.

The power interface 160 may be an interface for receiving power. However, the disclosure is not limited thereto, and the power interface 160 may be implemented in a form of being combined with the communication interface 140. For example in case the communication interface 140 is implemented in the HDMI standard, the communication interface 140 may include the power interface 160.

The sensor 170 may be a component for identifying another display apparatus. For example, the sensor 170 may include an NFC function, and the processor 130 may identify another display apparatus based on information received through the sensor. However, the disclosure is not limited thereto, and the sensor 170 can be any form if it is a component for identifying another display apparatus. Also, the processor 130 may receive identification information of another display apparatus directly from the another display apparatus through the communication interface 140.

The microphone 180 is a component for receiving input of a sound and converting the sound into an audio signal. The microphone 180 may be electrically connected with the processor 130, and may receive a sound by control by the processor 130.

For example, the microphone 180 may be formed as an integrated type integrated to the upper side or the front surface direction, the side surface direction, etc. of the display apparatus 100. Alternatively, the microphone 180 may be provided on a remote control, etc. separate from the display apparatus 100. In this case, the remote control may receive a sound through the microphone 180, and provide the received sound to the display apparatus 100.

The microphone 180 may include various components such as a microphone collecting a sound in an analog form, an amp circuit that amplifies the collected sound, an A/D conversion circuit that samples the amplified sound and converts the sound into a digital signal, a filter circuit that removes noise components from the converted digital signal, etc.

The microphone 180 may be implemented in the form of a sound sensor, and it can be in any type if it is a component that can collect sounds.

The speaker 190 is a component that outputs not only various kinds of audio data processed at the processor 130, but also various kinds of notification sounds or voice messages, etc.

The camera 195 is a component for photographing a still image or a moving image. The camera 195 may photograph a still image on a specific time point, but may also photograph a still image consecutively.

The camera 195 may photograph the front side of the display apparatus 100, and may thereby photograph the actual environment in front of the display apparatus 100. The processor 130 may also identify another display apparatus through the camera 195.

The camera 195 includes a lens, a shutter, an aperture, a solid state imaging element, an analog front end (AFE), and a timing generator (TG). The shutter adjusts the time when a light reflected on a subject enters the camera 195, and the aperture adjusts a light amount introduced into the lens by mechanically increasing or decreasing the size of an opening through which a light enters. When a light reflected on a subject is accumulated as photo charges, the solid state imaging element outputs a phase by the photo charges as an electric signal. The TG outputs a timing signal for reading out pixel data of the solid state imaging element, and the AFE samples the electric signal output from the solid state imaging element and digitalizes the signal.

As described above, the display apparatus can improve the user convenience by automatically changing the screen setting of the display 120.

Also, the display apparatus 100 can remove a sense of difference due to differences of screens as the user uses a plurality of displays by synchronizing the screen setting with another display apparatus connected with the display apparatus 100.

Hereinafter, operations of the display apparatus 100 will be described in more detail through FIG. 3 to FIG. 8. In FIG. 3 to FIG. 8, individual embodiments will be explained for the convenience of explanation. However, the individual embodiments in FIG. 3 to FIG. 8 can be carried out in any combined states.

Figure 3:
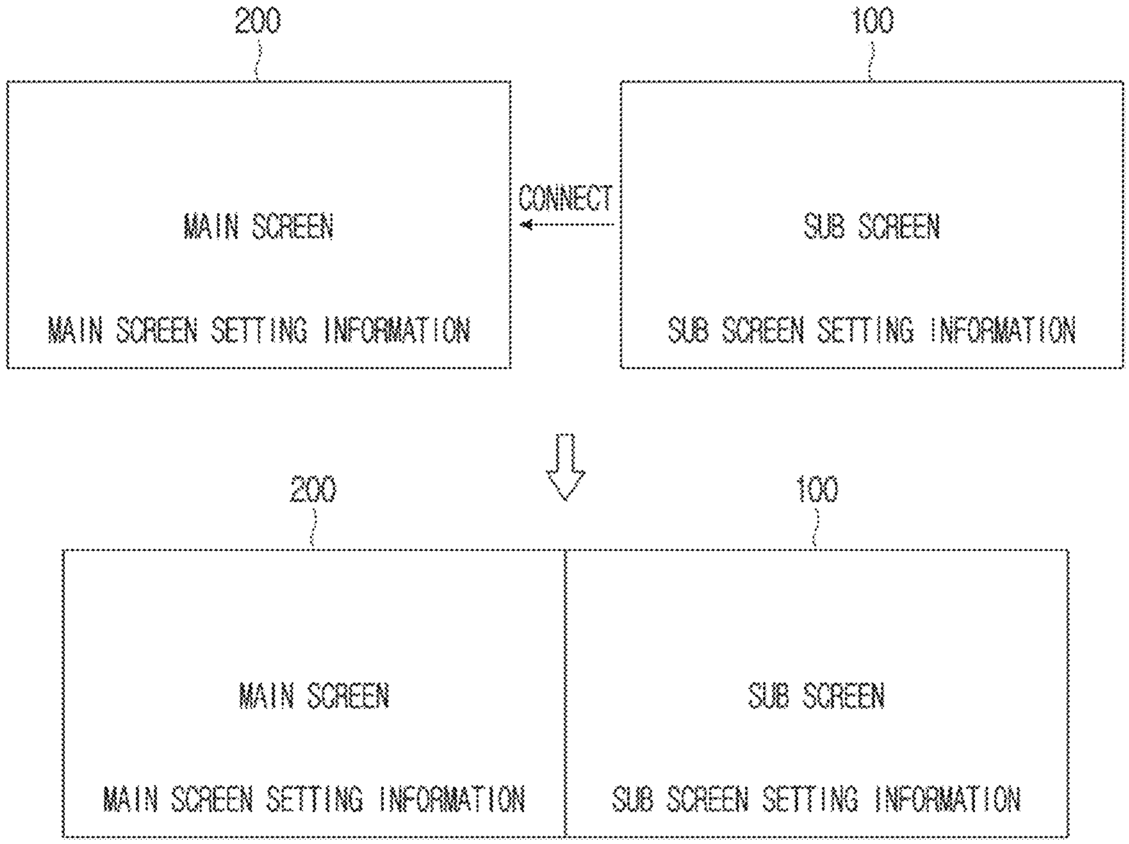
FIG. 3 is a diagram illustrating connection between displays according to one or more embodiments of the disclosure.

FIG. 3 is a diagram illustrating connection between displays according to one or more embodiments of the disclosure. In FIG. 3, it will be explained that the display apparatus 100 includes a sub screen, and another display apparatus 200 includes a main screen, for the convenience of explanation. Also, the screen setting information of the display apparatus 100 will be explained as sub screen setting information, and the screen setting information of the another display apparatus 200 will be explained as main screen setting information.

As illustrated in the upper part of FIG. 3, the display apparatus 100 may be connected to the another display apparatus 200. Here, the display apparatus 100 may store a past connection history with the another display apparatus 200. The past connection history may include identification information of the another display apparatus 200 and the sub screen setting information of the display apparatus 100. Here, the sub screen setting information of the display apparatus 100 may be the screen setting information of the display 120 when the display apparatus 100 was connected with the another display apparatus 200 in the past.

As illustrated in the lower part of FIG. 3, when the display apparatus 100 is connected with the another display apparatus 200, the processor 130 may identify the sub screen setting information corresponding to the another display apparatus 200, and change the screen setting of the display 120 based on the sub screen setting information. In this case, the processor 130 may store the screen setting information right before the screen setting of the display 120 was changed in the memory 110 based on the sub screen setting information. Afterwards, when the connection with the another display apparatus 200 is released, the processor 130 may restore the screen setting of the display 120 based on the screen setting information right before the screen setting was changed.

In case the connection with the another display apparatus 200 is the first time, the display apparatus 100 may not store a past connection history. In this case, the processor 130 may not change the screen setting of the display 120 even if the display apparatus 100 is connected with the another display apparatus 200.

However, the disclosure is not limited thereto, and in case the display apparatus 100 is connected with the another display apparatus 200 and the connection is the first time, the processor 130 may request screen setting information to the another display apparatus 200. When the main screen setting information is received from the another display apparatus 200, the processor 130 may change the screen setting of the display 120 based on the main screen setting information.

In the above, the display apparatuses were explained as the display apparatus 100 and the another display apparatus 200, but the disclosure is not limited thereto. For example, operations as above are possible also in a case wherein two smartphones are connected. Also, similar operations are possible also in a case wherein two monitors are connected to a desktop PC. In this case, the main body of the desktop PC may provide screen setting information according to a past connection history to the two monitors. For example, if a second monitor is additionally connected while a first monitor is connected, the desktop PC may change the screen setting of the first monitor and the second monitor based on the history that the first monitor and the second monitor were connected in the past.

Figure 4:
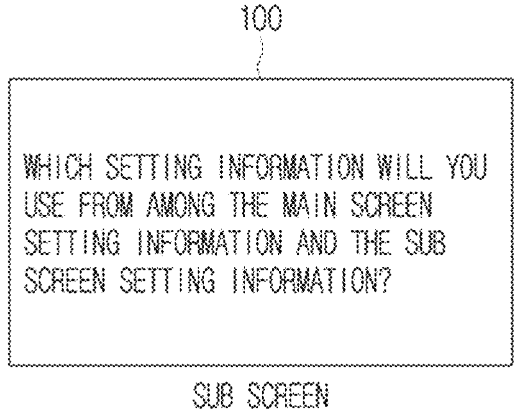
FIG. 4 is a diagram illustrating an operation of synchronizing screen settings according to various embodiments of the disclosure.
Figure 5:
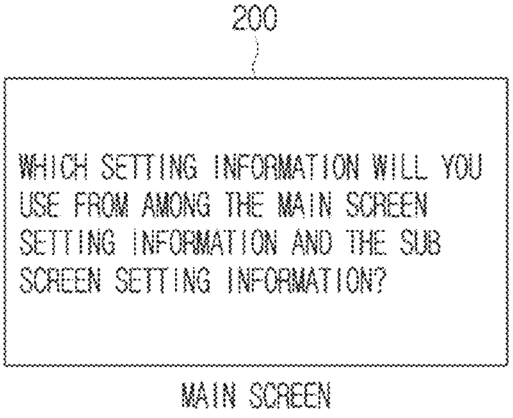
FIG. 5 is a diagram for illustrating an operation of synchronizing screen settings according to various embodiments of the disclosure.

FIG. 4 and FIG. 5 are diagrams illustrating an operation of synchronizing screen settings according to various embodiments of the disclosure.

As explained in FIG. 3, if the display apparatus 100 is connected with the another display apparatus 200, the processor 130 may change the screen setting of the display 120 based on the past connection history with the another display apparatus 200. When the connection of the display apparatus 100 with the another display apparatus 200 is released, the screen setting of the another display apparatus 200 may be changed, and in this case, the settings of the screens of the two apparatuses are different, and may thus make the user feel a sense of difference. Accordingly, an operation of synchronizing the screen settings of the screens of the two apparatuses may be needed.

First, as illustrated in FIG. 4, the subject of a synchronizing operation may be the display apparatus 100. For example, when the another display apparatus 200 is connected with the display apparatus 100, the another display apparatus 200 may provide the main screen setting information of the another display apparatus 200 to the display apparatus 100. However, the disclosure is not limited thereto, and when the display apparatus 100 is connected with the another display apparatus 200, the processor 130 may request screen setting information to the another display apparatus 200, and the another display apparatus 200 may provide the main screen setting information to the display apparatus 100 according to the request of the display apparatus 100.

When the main screen setting information is received from the another display apparatus 200, the processor 130 may compare the sub screen setting information and the main screen setting information, and if the two pieces of information are identical as a result of the comparison, the processor 130 may not perform any additional operation. Alternatively, if the two pieces of information are different as a result of the comparison, the processor 130 may display a message requesting the user's selection as in FIG. 4.

If a user instruction selecting the main screen setting information is received, the processor 130 may change the screen setting of the display 120 based on the main screen setting information, and if a user instruction selecting the sub screen setting information is received, the processor 130 may transmit the sub screen setting information to the another display apparatus 200. The another display apparatus 200 may change the screen setting of the another display based on the sub screen setting information.

If a user instruction was not received during a predetermined time after displaying a message, the processor 130 may change the screen setting of the display 120 based on the main screen setting information. This is an operation for not giving a sense of difference to the user's viewing. Specifically, before the display apparatus 100 is connected to the another display apparatus 200, the another display apparatus 200 may be in a state of reproducing a content, and when the display apparatus 100 is connected, the another display apparatus 200 may provide the content to the display apparatus 100. That is, the user may have been in a state of viewing the content through the another display apparatus 200, and in this case, if the screen setting of the another display apparatus 200 is changed, it may give a sense of difference to the user, and thus the screen setting of the display apparatus 100 may be changed.

As illustrated in FIG. 5, the subject of the synchronizing operation may be the another display apparatus 200. For example, when the display apparatus 100 is connected with the another display apparatus 200, the processor 130 may provide the sub screen setting information of the display apparatus 100 to the another display apparatus 200. However, the disclosure is not limited thereto, and when the another display apparatus 200 is connected with the display apparatus 100, the another display apparatus 200 may request screen setting information to the display apparatus 100, and the processor 130 may provide the sub screen setting information to the another display apparatus 200 according to the request of the another display apparatus 200.

When the sub screen setting information is received from the display apparatus 100, the another display apparatus 200 may compare the main screen setting information and the sub screen setting information, and if the two pieces of information are identical as a result of the comparison, the another display apparatus 200 may not perform any additional operation. Alternatively, if the two pieces of information are different as a result of the comparison, the another display apparatus 200 may display a message requesting the user's selection as in FIG. 5.

If a user instruction selecting the main screen setting information is received, the another display apparatus 200 may transmit the main screen setting information to the display apparatus 100, and the processor 130 may change the screen setting of the display 120 based on the main screen setting information. Alternatively, if a user instruction selecting the sub screen setting information is received, the another display apparatus 200 may change the screen setting information of the another display based on the sub screen setting information.

If a user instruction was not received during the predetermined time after displaying a message, the another display apparatus 200 may transmit the main screen setting information to the display apparatus 100.

Figure 6:
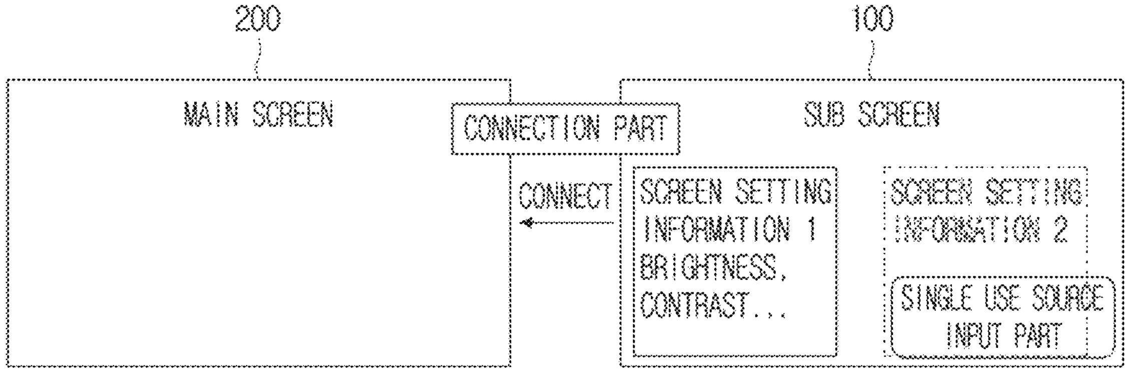
FIG. 6 is a diagram illustrating change of a connection device according to one or more embodiments of the disclosure.
Figure 7:
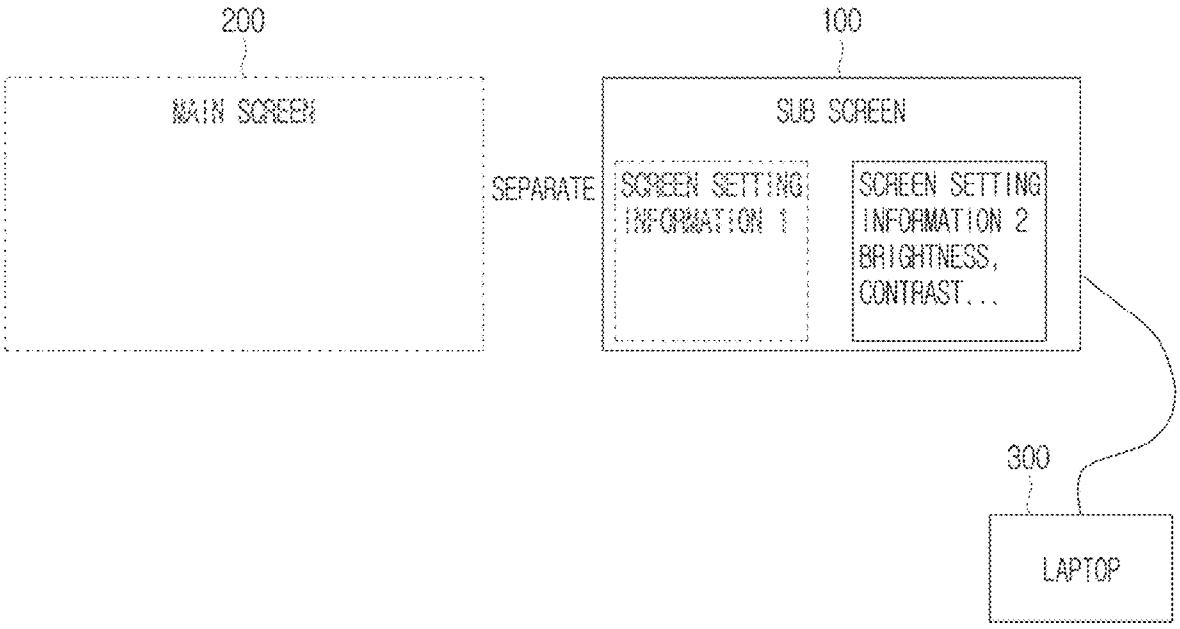
FIG. 7 is a diagram illustrating change of a connection device according to one or more embodiments of the disclosure.

FIG. 6 and FIG. 7 are diagrams illustrating change of a connection device according to one or more embodiments of the disclosure.

The display apparatus 100 may store first screen setting information 1 according to a past connection history with the another display apparatus 200, and second screen setting information 2 according to a past connection history with a laptop 300.

As illustrated in FIG. 6, if the display apparatus 100 is connected with the another display apparatus 200, the processor 130 may change the screen setting of the display 120 based on the first screen setting information 1 corresponding to the another display apparatus 200.

Afterwards, as illustrated in FIG. 7, if the connection with the another display apparatus 200 is released and the display apparatus 100 is connected with the laptop 300, the processor 130 may change the screen setting of the display 120 based on the second screen setting information 2 corresponding to the laptop 300.

Figure 8:
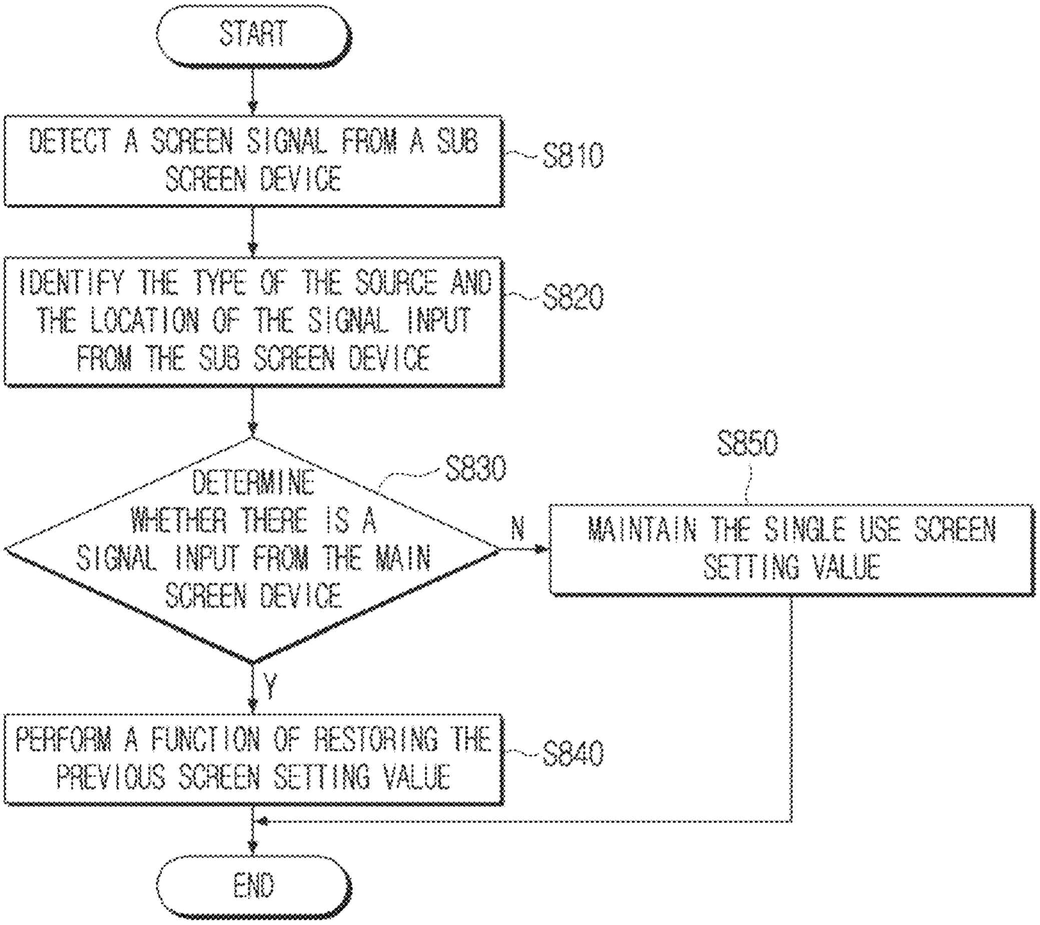
FIG. 8 is a flow chart illustrating a method of changing a screen setting according to one or more embodiments of the disclosure.

In FIG. 7 and FIG. 8, it was explained that the display apparatus 100 stores the first screen setting information 1 and the second screen setting information 2, for the convenience of explanation, but the disclosure is not limited thereto. For example, the display apparatus 100 may store all screen setting information corresponding to all apparatuses that have connection histories.

FIG. 8 is a flow chart illustrating a method of changing a screen setting according to one or more embodiments of the disclosure.

First, the processor 130 may detect a screen signal in operation S810. For example, when the display apparatus 100 is connected to another display apparatus, the processor 130 may detect a screen signal corresponding to a content provided by the another display apparatus 200.

The processor may identify the type of the source and the location of the screen signal in operation S820, and identify whether the signal is a signal received from the another display apparatus 200 in operation S830.

If the screen signal is a signal received from the another display apparatus 200, the processor 130 may restore the previous screen setting value in operation S840, and if the screen signal is not a signal received from the another display apparatus 200, the processor 130 may maintain the single use screen setting value in operation S850.

Figure 9:
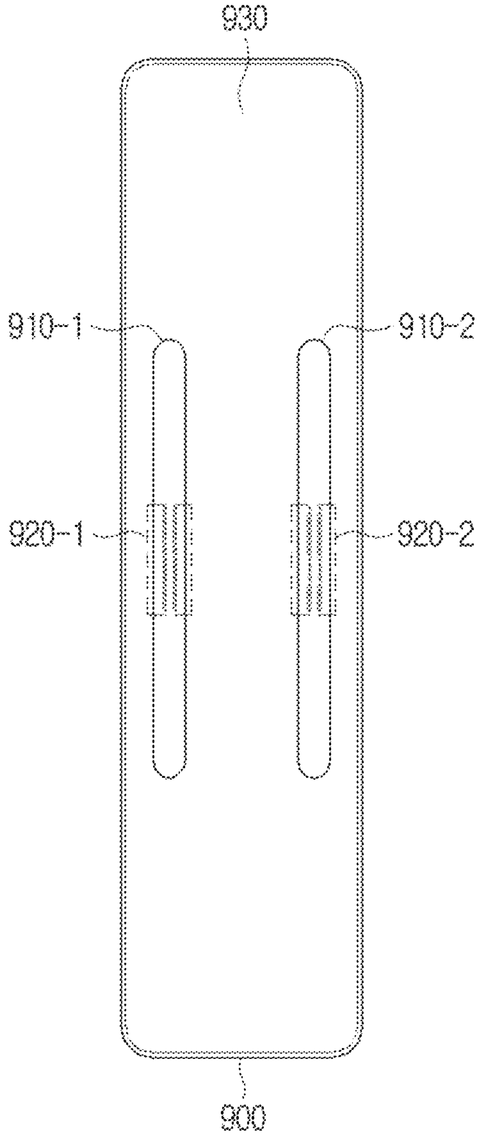
FIG. 9 is a diagram illustrating a structure connecting a plurality of display apparatuses according to one or more embodiments of the disclosure.
Figure 10:
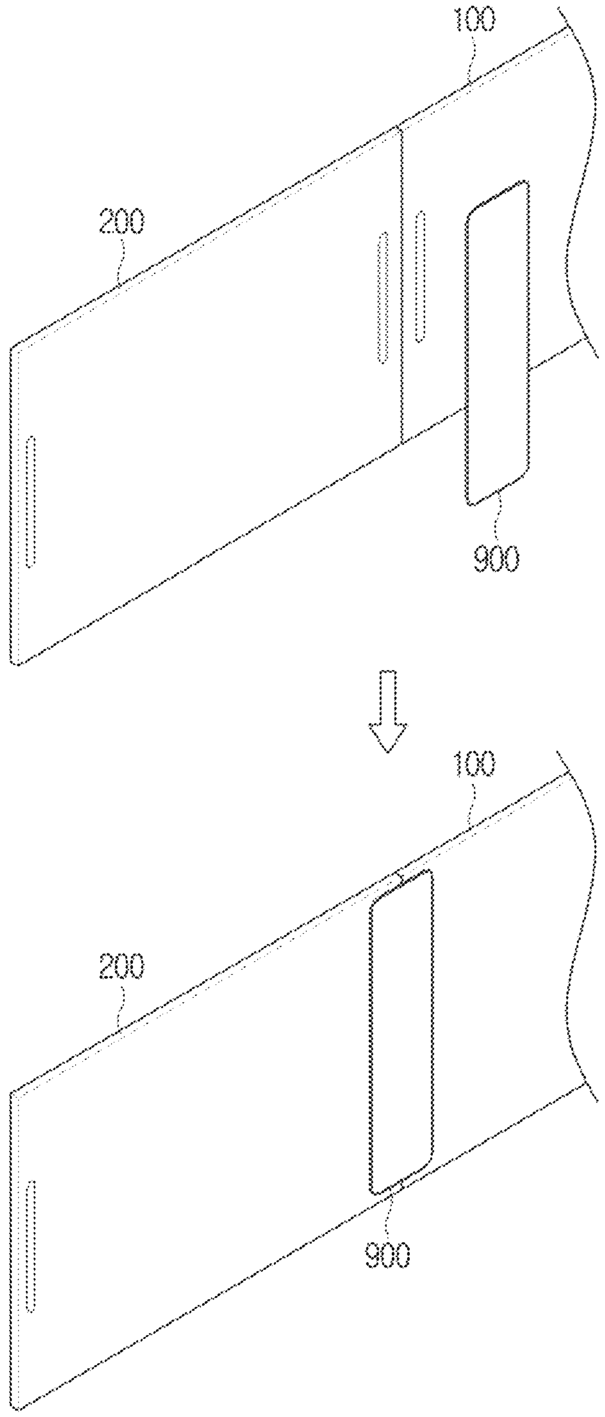
FIG. 10 is a diagram illustrating a structure connecting a plurality of display apparatuses according to one or more embodiments of the disclosure.

FIG. 9 and FIG. 10 are diagrams illustrating a structure connecting a plurality of display apparatuses according to one or more embodiments of the disclosure.

The connection member 900 may be a structure that connects the display apparatus 100 and the another display apparatus 200. For example, as illustrated in FIG. 9, the connection member 900 may be implemented as a bar shape, and may include a first projection part 910-1 and a second projection part 910-2 that are respectively inserted into the rear surfaces of the display apparatus 100 and the another display apparatus 200.

The rear surface of the display apparatus 100 and the rear surface of the another display apparatus 200 may include grooves into which the first projection part 910-1 and the second projection part 910-2 can be inserted, as illustrated on the left side of FIG. 10. Also, as illustrated on the right side of FIG. 10, when the first projection part 910-1 and the second projection part 910-2 are respectively inserted into the display apparatus 100 and the another display apparatus 200, the display apparatus 100 and the another display apparatus 200 may be physically or electrically connected through the connection member 900.

The first projection part 910-1 may include a pogo-pin connector 920-1, and the second projection part 910-2 may include a pogo-pin connector 920-2. The display apparatus 100 may perform communication with the another display apparatus 200 through the pogo-pin connector 920-1 of the first projection part 910-1 and the pogo-pin connector 920-2 of the second projection part 910-2.

The first projection part 910-1 may further include a magnet arranged around the pogo-pin connector 920-1, and the second projection part 910-2 may further include a magnet arranged around the pogo-pin connector 920-2, and by the magnet of the first projection part 910-1 and the magnet of the second projection part 910-2, the connection between the display apparatus 100 and the another display apparatus 200 can be fixed.

The connection member 900 may further include a folding member 930 connecting the first projection part 910-1 and the second projection part 910-2. The folding member 930 may be folded by an external force, and fold the display apparatus 100 and the another display apparatus 200 at a specific angle.

However, the disclosure is not limited thereto, and any structure can be used if it is a structure that can connect the display apparatus 100 and the another display apparatus 200.

Figure 11:
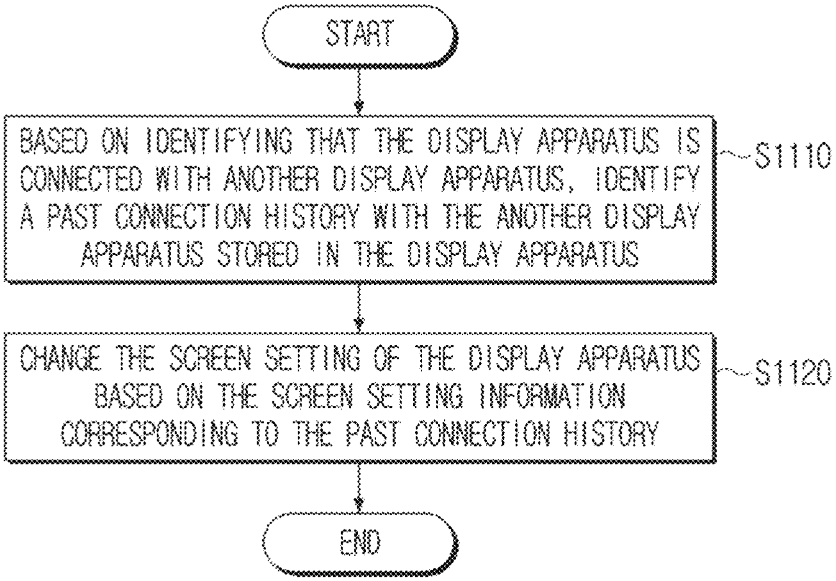
FIG. 11 is a flow chart illustrating a control method of a display apparatus according to one or more embodiments of the disclosure.

FIG. 11 is a flow chart illustrating a control method of a display apparatus according to one or more embodiments of the disclosure.

First, if it is identified that the display apparatus is connected with another display apparatus, a past connection history with the another display apparatus stored in the display apparatus is identified in operation S1110. Then, the screen setting of the display apparatus is changed based on the screen setting information corresponding to the past connection history in operation S1120.

Also, the control method may further include the operations of, based on receiving another screen setting information of another display included in the another display apparatus from the another display apparatus, comparing the screen setting information and the another screen setting information, and based on identifying that the screen setting information and the another screen setting information are different as a result of the comparison, displaying a message inducing to select one of the screen setting information or the another screen setting information.

Then, in the changing operation S1120, based on receiving a user instruction selecting one of the screen setting information or the another screen setting information, the screen setting of the display may be changed based on screen setting information corresponding to the user instruction.

Also, in the changing operation S1120, based on receiving a user instruction selecting the screen setting information, the screen setting of the display may be changed based on the screen setting information, and the screen setting information may be transmitted to the another display apparatus.

In addition, the control method may further include the operation of transmitting the screen setting information to the another display apparatus, and in the changing operation S1120, based on receiving another screen setting information of another display included in the another display apparatus from the another display apparatus, the screen setting of the display may be changed based on the another screen setting information.

Also, the control method may further include the operation of, based on being connected with the another display apparatus, receiving power from the another display apparatus, and receiving a content from the another display apparatus.

In addition, the control method may further include the operation of, based on the connection with the another display apparatus being released, mapping identification information of the another display apparatus and screen setting information on a time point when the connection with the another display apparatus is released, and storing the information.

Also, the display apparatus may store a plurality of identification information of a plurality of electronic apparatuses and a plurality of screen setting information corresponding to each of the plurality of identification information as the past connection history, and in the identifying operation S1110, based on identifying that the display apparatus is connected with the another display apparatus, screen setting information corresponding to the another display apparatus among the plurality of screen setting information may be identified.

In addition, in the identifying operation S1110, it may be identified that the display apparatus is connected with the another display apparatus through the sensor included in the display apparatus.

Also, the display apparatus may be implemented as a modular display.

According to the various embodiments of the disclosure as described above, the display apparatus can improve the user convenience by automatically changing the screen setting of the display.

Also, the display apparatus can remove a sense of difference due to differences of screens as the user uses a plurality of displays by synchronizing the screen setting with another display apparatus connected with the display apparatus.

Above, it was explained that the display apparatus stores screen setting information corresponding to a past connection history, but the disclosure is not limited thereto. For example, each of the display apparatus and another display apparatus may receive screen setting information corresponding to a past connection history from a server, and change the screen setting of the display of each of them.

Also, the display apparatus may not use a past connection history. For example, when the display apparatus is connected with another display apparatus, the display apparatus may request photographing including the another display apparatus to a user terminal apparatus such as a smartphone. When a photographed image including the display apparatus and the another display apparatus is received from the user terminal device, the display apparatus may acquire first screen setting information for changing the screen setting of the display and second screen setting information for changing the screen setting of another display based on the photographed image. The display apparatus may change the screen setting of the display based on the first screen setting information, and provide the second screen setting information to the another display apparatus. The another display apparatus may change the screen setting of the another display based on the second screen setting information. Here, the first screen setting information and the second screen setting information may be different.

According to one or more embodiments of the disclosure, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the embodiments disclosed herein (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' means that a storage medium does not include signals, and is tangible, but does not indicate whether data is stored in the storage medium semi-permanently or temporarily.

Also, according to one or more embodiments, the methods according to the aforementioned various embodiments may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to one or more embodiments of the disclosure, the aforementioned various embodiments may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as processes and functions described in this specification may be implemented as separate software. Each of the software can perform one or more functions and operations described in this specification.

Computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory, etc. As specific examples of a non-transitory computer-readable medium, there may be a CD, a DVD, a hard disc, a blue-ray disc, a USB, a memory card, a ROM and the like.

Also, each of the components according to the aforementioned various embodiments (e.g., a module or a program) may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

While the disclosure has been particularly shown and described with reference to example embodiments thereof, it will be understood that various changes in form and details may be made therein without departing from the spirit and scope of the following claims.

What is claimed is:

1. A display apparatus comprising:
at least one memory storing instructions;
a first display;
a communication interface; and
at least one processor operatively connected with the at least one memory and the first display and configured to control the display apparatus, wherein the at least one processor is configured to execute the instructions to:
based on identifying that the display apparatus is connected with a second display apparatus, identify a past connection history with the second display apparatus and first screen setting information corresponding to the past connection history, stored in the at least one memory; based on receiving second screen setting information of a second display in the second display apparatus through the communication interface, compare the first screen setting information and the second screen setting information;
based on identifying that the first screen setting information and the second screen setting information are different as a result of the comparing, control the first display to display a message requesting to select one of the first screen setting information or the second screen setting information; and change a screen setting of the display based on selected screen setting information.

2. The display apparatus of claim 1, wherein the communication interface is wireless.

3. The display apparatus of claim 1, further comprising: a user interface, wherein the at least one processor is further configured to execute the instructions to, based on receiving a user instruction selecting one of the first screen setting information or the second screen setting information through the user interface, change the screen setting of the display apparatus based on the selected screen setting information corresponding to the user instruction.

4. The display apparatus of claim 3, wherein the at least one processor is further configured to execute the instructions to, based on receiving the user instruction, change the screen setting of the display apparatus based on the selected screen setting information, and control the communication interface to transmit the selected screen setting information to the second display apparatus.

5. The display apparatus of claim 1, wherein the at least one processor is further configured to execute the instructions to:

control the communication interface to transmit the first screen setting information to the second display apparatus; and based on receiving the second screen setting information from the second display apparatus through the communication interface, change the screen setting of the display apparatus based on the second screen setting information.

6. The display apparatus of claim 1, further comprising: a power interface, wherein the at least one processor is further configured to execute the instructions to, based on being connected with the second display apparatus, receive power from the second display apparatus through the power interface, and receive a content from the second display apparatus through the communication interface.

7. The display apparatus of claim 1, wherein the at least one processor is further configured to execute the instructions to:

based on a connection with the second display apparatus being ended, map identification information of the second display apparatus and screen setting information on a time point when the connection with the second display apparatus is ended; and store the identification information in the at least one memory.

8. The display apparatus of claim 1, wherein the at least one memory is configured to store a plurality of identification information of a plurality of electronic apparatuses and a plurality of screen setting information corresponding to each of the plurality of identification information as the past connection history, and wherein the at least one processor is further configured to execute the instructions to, based on identifying that the display apparatus is connected with the second display apparatus, identify the second screen setting information corresponding to the second display apparatus among the plurality of screen setting information stored in the at least one memory.

9. The display apparatus of claim 1, further comprising: a sensor, wherein the at least one processor is configured to execute the instructions to, identify that the display apparatus is connected with the second display apparatus through the sensor.

10. The display apparatus of claim 1, wherein the display apparatus is a modular display.

11. A control method of a display apparatus, the method comprising:

based on identifying that the display apparatus is connected with a second display apparatus, identifying a past connection history with the second display apparatus and first screen setting information corresponding to the past connection history, stored in the display apparatus;

based on receiving second screen setting information of a second display in the second display apparatus from the second display apparatus through a communication interface, comparing the first screen setting information and the second screen setting information;

based on identifying that the first screen setting information and the second screen setting information are different as a result of the comparing, displaying a message requesting to select one of the first screen setting information or the second screen setting information; and changing a screen setting of the display apparatus based on selected screen setting information.

12. The control method of claim 11, wherein the communication interface is wireless.

13. The control method of claim 11, wherein the changing the screen setting comprises:

based on receiving a user instruction selecting one of the first screen setting information or the second screen setting information, changing the screen setting of the display apparatus based on the selected screen setting information corresponding to the user instruction.

14. The control method of claim 13, wherein the changing the screen setting further comprises:

transmitting the selected screen setting information to the second display apparatus.

15. The control method of claim 11, further comprising:

transmitting the first screen setting information to the second display apparatus, wherein the changing the screen setting comprises:

based on receiving second screen setting information of a second display in the second display apparatus from the second display apparatus, changing the screen setting of the display apparatus based on the second screen setting information.

16. The control method of claim 11, further comprising:

based on being connected with the second display apparatus, receiving power from the second display apparatus through a power interface, and receiving a content from the second display apparatus through the communication interface.

17. The control method of claim 11, further comprising:

based on a connection with the second display apparatus being ended, mapping identification information of the second display apparatus and screen setting information on a time point when the connection with the second display apparatus is ended; and storing the identification information in at least one memory.

18. The control method of claim 11, further comprising:

storing, on at least one memory, a plurality of identification information of a plurality of electronic apparatuses and a plurality of screen setting information corresponding to each of the plurality of identification information as the past connection history; and based on identifying that the display apparatus is connected with the second display apparatus, identifying the second screen setting information corresponding to the second display apparatus among the plurality of screen setting information stored in the at least one memory.

19. The control method of claim 11, further comprising:

identifying that the display apparatus is connected with the second display apparatus through a sensor.

20. The control method of claim 11, wherein the display apparatus is a modular display.

* * * * *